US010928213B2

(12) United States Patent
Jin et al.

(10) Patent No.: US 10,928,213 B2
(45) Date of Patent: Feb. 23, 2021

(54) IN-VEHICLE DEVICE, INFORMATION PROCESSING DEVICE, INFORMATION PROCESSING SYSTEM, CONTROL METHOD FOR IN-VEHICLE DEVICE, INFORMATION PROCESSING METHOD, AND RECORDING MEDIUM

(71) Applicant: TOYOTA JIDOSHA KABUSHIKI KAISHA, Toyota (JP)

(72) Inventors: Xin Jin, Nagoya (JP); Miharu Hanai, Obu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 226 days.

(21) Appl. No.: 16/053,008

(22) Filed: Aug. 2, 2018

(65) Prior Publication Data

US 2019/0094037 A1   Mar. 28, 2019

(30) Foreign Application Priority Data

Sep. 22, 2017  (JP) .............................. JP2017-182405

(51) Int. Cl.
*G01C 21/36* (2006.01)
*G08G 1/0969* (2006.01)
(Continued)

(52) U.S. Cl.
CPC ..... *G01C 21/3602* (2013.01); *G01C 21/3617* (2013.01); *G01C 21/3641* (2013.01);
(Continued)

(58) Field of Classification Search
CPC ............ G01C 21/3602; G01C 21/3617; G01C 21/3641; G01C 21/3682; G01C 21/3697;
(Continued)

(56) References Cited

U.S. PATENT DOCUMENTS 7,085,253 B2 *  8/2006  Yang ...................... H04W 8/20
                                                  370/338
8,538,686 B2 *  9/2013  Gruen ................ G01C 21/3617
                                                  190/102
(Continued)

FOREIGN PATENT DOCUMENTS

EP    1168715 A2 *  1/2002  ............. G01C 21/34
EP    1542489 A1 *  6/2005  ............ H04W 64/00
(Continued)

OTHER PUBLICATIONS

Ahsan et al., "Location, Time, and Preference Aware Restaurant Recommendation Method," 2016, Publisher: IEEE.*
(Continued)

*Primary Examiner* — Tuan C To
(74) *Attorney, Agent, or Firm* — Hunton Andrews Kurth LLP

(57) ABSTRACT

An in-vehicle device that is connected to an image pickup device and that is utilized by a first user, the in-vehicle device includes: a location information transmission unit configured to transmit first location information indicating a location of the in-vehicle device to an information processing device; a visit history receiving unit configured to receive visit history information of a second user, the visit history information being acquired by the information processing device based on preference information of the first user indicating a preference of the first user; and an image pickup control unit configured to cause the image pickup device to acquire an image based on a result of comparison between a first location indicated by the first location information and a second location indicated by second location information about a visited place which is visited by the second user included in the visit history information.

20 Claims, 10 Drawing Sheets

(51) Int. Cl.
*G06Q 50/00* (2012.01)
*G08G 1/137* (2006.01)
*G06F 16/9535* (2019.01)

(52) U.S. Cl.
CPC ..... *G01C 21/3682* (2013.01); *G01C 21/3697* (2013.01); *G06Q 50/01* (2013.01); *G08G 1/0969* (2013.01); *G01C 21/3679* (2013.01); *G06F 16/9535* (2019.01); *G08G 1/137* (2013.01)

(58) Field of Classification Search
CPC ............ G01C 21/3679; G01C 21/3647; G06Q 50/01; G08G 1/0969; G08G 1/137; G06F 16/9535
USPC .......................................................... 701/424
See application file for complete search history.

(56) References Cited

U.S. PATENT DOCUMENTS

| | | | | |
|---|---|---|---|---|
| 9,146,129 | B1* | 9/2015 | Furio | G01C 21/3682 |
| 9,485,318 | B1* | 11/2016 | Harris | H04W 4/029 |
| 2010/0198591 | A1* | 8/2010 | Yoshizawa | G06Q 10/00 |
| | | | | 704/231 |
| 2010/0217672 | A1* | 8/2010 | Maeno | H04L 67/18 |
| | | | | 705/14.58 |
| 2012/0323691 | A1* | 12/2012 | McLaughlin | G07C 9/20 |
| | | | | 705/14.58 |
| 2013/0014137 | A1* | 1/2013 | Bhatia | G06Q 30/0201 |
| | | | | 725/9 |
| 2014/0005941 | A1* | 1/2014 | Paek | G01C 21/3415 |
| | | | | 701/533 |
| 2014/0058672 | A1* | 2/2014 | Wansley | G01C 21/3461 |
| | | | | 701/533 |
| 2015/0170210 | A1* | 6/2015 | Rhee | G06Q 30/0241 |
| | | | | 705/14.64 |
| 2015/0286994 | A1* | 10/2015 | Elder | G06Q 10/20 |
| | | | | 705/305 |
| 2015/0301579 | A1* | 10/2015 | Vaccari | G06F 16/18 |
| | | | | 713/340 |
| 2016/0116299 | A1* | 4/2016 | Kim | G06Q 50/30 |
| | | | | 701/438 |
| 2016/0132705 | A1* | 5/2016 | Kovarik | G06K 7/10376 |
| | | | | 340/10.3 |
| 2016/0148218 | A1* | 5/2016 | Koch | G06Q 50/01 |
| | | | | 705/7.29 |
| 2016/0370194 | A1* | 12/2016 | Colijn | G08G 1/22 |
| 2017/0068872 | A1* | 3/2017 | Short | G06Q 50/12 |
| 2017/0254660 | A1* | 9/2017 | Panahandeh | G01C 21/3484 |
| 2017/0337573 | A1* | 11/2017 | Toprak | G07C 5/006 |
| 2018/0151072 | A1* | 5/2018 | Altinger | H04W 4/44 |
| 2019/0360834 | A1* | 11/2019 | Shi | G01C 21/3484 |

FOREIGN PATENT DOCUMENTS

| | | | |
|---|---|---|---|
| JP | 2000-280832 | A | 10/2000 |
| JP | 2002-213973 | A | 7/2002 |
| JP | 2003-198904 | A | 7/2003 |
| JP | 2009-009329 | A | 1/2009 |
| JP | 5603763 | B2 * | 10/2014 |
| JP | 2016213658 | A * | 12/2016 |

OTHER PUBLICATIONS

A.G. Bors et al., "Prediction and Tracking of Moving Objects in Image Sequences," 2000, vol. 9, Publisher: IEEE.*

* cited by examiner

FIG. 8

| VEHICLE ID | SNS USER ID |
|---|---|
| AAA | aaa |
| BBB | bbb |
| CCC | ccc |
| ⋮ | ⋮ |

| SNS USER ID | NAME | DATE AND TIME | LOCATION INFORMATION | SPOT NAME | ACCOMPANYING INFORMATION | ... |
|---|---|---|---|---|---|---|
| ... | ... | ... | ... | ... | ... | ... |

IN-VEHICLE DEVICE, INFORMATION PROCESSING DEVICE, INFORMATION PROCESSING SYSTEM, CONTROL METHOD FOR IN-VEHICLE DEVICE, INFORMATION PROCESSING METHOD, AND RECORDING MEDIUM

INCORPORATION BY REFERENCE

The disclosure of Japanese Patent Application No. 2017-182405 filed on Sep. 22, 2017 including the specification, drawings and abstract is incorporated herein by reference in its entirety.

BACKGROUND

1. Technical Field

The disclosure relates to an in-vehicle device, an information processing device, an information processing system, a control method for an in-vehicle device, an information processing method, and a recording medium.

2. Description of Related Art

There is an image pickup system in which pieces of location information of spots recommended for image pickup are recorded in an information center in advance, a vehicle downloads the pieces of location information via the Internet, and, when a current location of the vehicle coincides with any one of the locations of the spots recommended, captures an image (see, for example, Japanese Unexamined Patent Application Publication No. 2003-198904 (JP 2003-198904 A)).

SUMMARY

However, with the technique described in JP 2003-198904 A, the scenery of a spot that neither really interests a user of the vehicle nor suits a user's preference is also captured.

The disclosure provides an in-vehicle device, an information processing device, an information processing system, a control method for an in-vehicle device, an information processing method, and a recording medium that are able to acquire an image that suits a preference of a user of a vehicle.

An in-vehicle device according to a first aspect of the disclosure is connected to an image pickup device and is utilized by a first user. The in-vehicle device includes: a location information transmission unit configured to transmit first location information indicating a location of the in-vehicle device to an information processing device; a visit history receiving unit configured to receive visit history information of a second user, the visit history information being acquired by the information processing device based on preference information of the first user indicating a preference of the first user; and an image pickup control unit configured to cause the image pickup device to acquire an image based on a result of comparison between a first location indicated by the first location information and a second location indicated by second location information about a visited place which is visited by the second user included in the visit history information.

According to the above aspect, it is possible to acquire an image by utilizing the visit history information of the second user. The visit history information is acquired based on the preference information that indicates the preference of the first user.

Therefore, it is possible to provide the in-vehicle device that is able to acquire an image that suits the preference of the user of the vehicle.

In the above aspect, the second user may be a user having a relationship with the first user on social media.

According to the above aspect, the visit history information of the second user having a relationship with the first user on social media is provided to the in-vehicle device of the first user.

Therefore, it is possible to provide the in-vehicle device that is able to acquire an image that suits the preference of the first user based on interactions between people.

In the above aspect, a degree of similarity between the preference indicated by the preference information of the first user and a preference of the second user may be higher than or equal to a predetermined degree.

According to the above aspect, the visit history information of the second user having a high degree of similarity in preference with the first user is provided to the in-vehicle device of the first user.

Therefore, it is possible to provide the in-vehicle device that is able to acquire an image that fairly suits the preference of the first user.

In the above aspect, the degree of similarity may increase as a degree of relationship between the first user and the second user on social media increases.

According to the above aspect, the visit history information of the second user having a high degree of relationship with the first user on social media is provided to the in-vehicle device of the first user.

Therefore, it is possible to provide the in-vehicle device that is able to acquire an image that probably suits the preference of the first user.

In the above aspect, the degree of similarity may be determined based on at least one of a birthplace of each of the first user and the second user, an age of each of the first user and the second user, a common friend of both the first user and the second user, a hobby of each of the first user and the second user, a place of work of each of the first user and the second user, an exchange of a comment between the first user and the second user on the social media, the number of times that the first user reads a post of the second user, and the number of times that the second user reads a post of the first user.

According to the above aspect, the visit history information of the second user determined to have a high degree of similarity in preference with the first user based on the birthplace, age, and the like, of the second user is provided to the in-vehicle device of the first user.

Therefore, it is possible to provide the second location information that is probably useful for the first user.

In the above aspect, the second location information may be information uploaded to social media by the second user.

According to the above aspect, the visit history information including the second location information uploaded to social media is provided to the in-vehicle device of the first user.

Therefore, it is possible to provide the second location information about which the first user probably empathizes.

In the above aspect, the second location information may be information indicating a location at which an image uploaded to social media by the second user is acquired or information indicating a location associated with post information posted to social media by the second user.

According to the above aspect, the visit history information including the location at which the image uploaded to social media has been acquired or the location associated with the posted information as the second location information is provided to the in-vehicle device of the first user.

Therefore, it is possible to provide the second location information about which the first user more probably empathizes.

In the above aspect, the visited place may be a facility, sightseeing area, or shop that the second user has ever visited. And, the second location may be a location of the facility, a location of the sightseeing area, or a location of the shop.

According to the above aspect, the visit history information including the location of the facility, sightseeing area or shop that the second user has ever visited as the second location information is provided to the in-vehicle device of the first user.

Therefore, it is possible to provide the second location information about the location of the facility, sightseeing area or shop about which the first user more probably empathizes.

In the above aspect, the image pickup control unit may be configured to cause the image pickup device to acquire the image from when a distance between the first location and the second location becomes shorter than or equal to a first predetermined distance to when the first location and the second location coincide with each other.

According to the above aspect, the image of the surrounding area within the range shorter than or equal to the first predetermined distance from the current location is acquired.

Therefore, it is possible to provide the in-vehicle device that is able to acquire the image that reliably includes a visited place of the second user.

In the above aspect, the image pickup control unit may be configured to extract, from the images acquired by the image pickup device, the image at a time when the first location and the second location coincide with each other or the image at a time when the first location is located near the second location.

According to the above aspect, the image at the time when the first location and the second location coincide with each other or are close to each other is extracted in the in-vehicle device.

Therefore, it is possible to provide the in-vehicle device that is able to reliably acquire the image of a visited place of the second user.

In the above aspect, the in-vehicle device may further include a visit history display unit configured to, when the distance between the first location and the second location becomes shorter than or equal to a second predetermined distance longer than the first predetermined distance, display the second location and a name of the second user on map data.

According to the above aspect, the visit history information of the surrounding area within the range shorter than or equal to the second predetermined distance is provided to the in-vehicle device.

Therefore, it is possible to provide the in-vehicle device that allows the first user to identify a visited place of the second user around the current location and easily make a stop.

In the above aspect, the first user may be a user of a vehicle on which the image pickup device is mounted.

According to the above aspect, the visit history information of the second user having a high degree of similarity in preference with the user of the vehicle is provided to the in-vehicle device.

Therefore, it is possible to acquire the image by utilizing the visit history information of the second user. The visit history information is acquired based on the preference information that indicates the preference of the user of the vehicle.

An information processing device according to a second aspect of the disclosure includes: a receiving unit configured to receive first location information from an in-vehicle device that is utilized by a first user and that is connected to an image pickup device; a visit history acquisition unit configured to acquire visit history information of a second user based on preference information of the first user indicating a preference of the first user; a location information acquisition unit configured to acquire second location information about a visited place included in the visit history information; a transmission unit configured to transmit the second location information to the in-vehicle device.

According to the above aspect, it is possible to acquire the image by utilizing the visit history information of the second user. The visit history information is acquired based on the preference information that indicates the preference of the first user.

Therefore, it is possible to provide the information processing device that is able to acquire the image that suits the preference of the user of the vehicle.

In the above aspect, the information processing device may further comprising an image recording control unit configured to store an image transmitted from the in-vehicle device in a storage unit.

An information processing system according to a third aspect of the disclosure includes: an in-vehicle device that is connected to an image pickup device and that is utilized by a first user; and an information processing device communicable with the in-vehicle device via a network, wherein: the in-vehicle device includes a location information transmission unit configured to transmit first location information indicating a location of the in-vehicle device to the information processing device, a visit history receiving unit configured to receive visit history information of a second user, the visit history information being acquired by the information processing device, and an image pickup control unit configured to cause the image pickup device to acquire an image based on a result of comparison between a first location indicated by the first location information and a second location indicated by second location information about a visited place included in the visit history information; and the information processing device includes a receiving unit configured to receive the first location information from the in-vehicle device, a visit history acquisition unit configured to acquire the visit history information of the second user based on preference information of the first user indicating a preference of the first user, a location information acquisition unit configured to acquire the second location information, and a transmission unit configured to transmit the second location information to the in-vehicle device.

In the above aspect, the information processing system may further include a social media server configured to store posts indicating spots that social media users have visited and user information of the social media users, wherein the information processing device is configured to acquire the visit history information of the second user, a degree of similarity between the preference of the first user and the a preference of the second user is equal to or larger than a predetermined value, the degree of similarity is calculated based on the user information of the first user and the user information of the second user.

According to the above aspect, it is possible to acquire the image by utilizing the visit history information of the second user. The visit history information is acquired based on the preference information that indicates the preference of the first user.

Therefore, it is possible to provide the information processing system that is able to acquire the image that suits the preference of the user of the vehicle.

A control method for an in-vehicle device is connected to an image pickup device and is utilized by a first user. The control method according to a fourth aspect of the disclosure includes: transmitting, by a computer included in the in-vehicle device, first location information indicating a current location of the in-vehicle device to an information processing device; receiving, by the computer, visit history information of a second user, the visit history information being acquired by the information processing device based on preference information of the first user indicating a preference of the first user; and causing the image pickup device, by the computer, to acquire an image based on a result of comparison between a second location indicated by second location information about a visited place included in the visit history information and a first location indicated by the first location information.

According to the above aspect, it is possible to acquire the image by utilizing the visit history information of the second user. The visit history information is acquired based on the preference information that indicates the preference of the first user.

Therefore, it is possible to provide the control method for an in-vehicle device, which is able to acquire the image that suits the preference of the user of the vehicle.

A non-transitory computer-readable recording medium on which a program is recorded according to a fifth aspect of the disclosure, the program being a control program for an in-vehicle device that is connected to an image pickup device and that is utilized by a first user, the program causing a computer included in the in-vehicle device to execute instructions for: transmitting first location information indicating a current location of the in-vehicle device to an information processing device; receiving visit history information of a second user, the visit history information being acquired by the information processing device based on preference information of the first user indicating a preference of the first user; and causing the image pickup device to acquire an image based on a result of comparison between a second location indicated by second location information about a visited place included in the visit history information and a first location indicated by the first location information.

According to the above aspect, it is possible to acquire the image by utilizing the visit history information of the second user. The visit history information is acquired based on the preference information that indicates the preference of the first user.

Therefore, it is possible to provide the recording medium on which the control program for an in-vehicle device, which is able to acquire the image that suits the preference of the user of the vehicle, is recorded.

An information processing method according to a sixth aspect of the disclosure includes: receiving, by an information processing device, first location information from an in-vehicle device that is utilized by a first user and that is connected to an image pickup device; acquiring, by the information processing device, visit history information of a second user based on preference information of the first user indicating a preference of the first user; acquiring, by the information processing device, second location information about a visited place included in the visit history information; and transmitting, by the information processing device, the second location information to the in-vehicle device.

According to the above aspect, it is possible to acquire the image by utilizing the visit history information of the second user. The visit history information is acquired based on the preference information that shows the preference of the first user.

Therefore, it is possible to provide the information processing method that is able to acquire the image that suits the preference of the user of the vehicle.

A non-transitory computer-readable recording medium on which a program is recorded according to a seventh aspect of the disclosure, the program causing an information processing device to execute instructions for: receiving first location information from an in-vehicle device that is utilized by a first user and that is connected to an image pickup device; acquiring visit history information of a second user based on preference information of the first user indicating a preference of the first user; acquiring second location information about a visited place included in the visit history information; and transmitting the second location information to the in-vehicle device.

According to the above aspect, it is possible to acquire the image by utilizing the visit history information of the second user. The visit history information is acquired based on the preference information that indicates the preference of the first user.

Therefore, it is possible to provide the recording medium on which the information processing program that is able to acquire the image that suits the preference of the user of the vehicle is recorded.

It is possible to provide the in-vehicle device, the information processing device, the information processing system, the control method for an in-vehicle device, the information processing method, and the recording medium that are able to acquire the image that suits the preference of the user of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a table that shows an example of the configuration of an ID correspondence storage unit;

FIG. 9 is a table that shows an example of posted spot information;

DETAILED DESCRIPTION OF EMBODIMENTS

Figure 1:
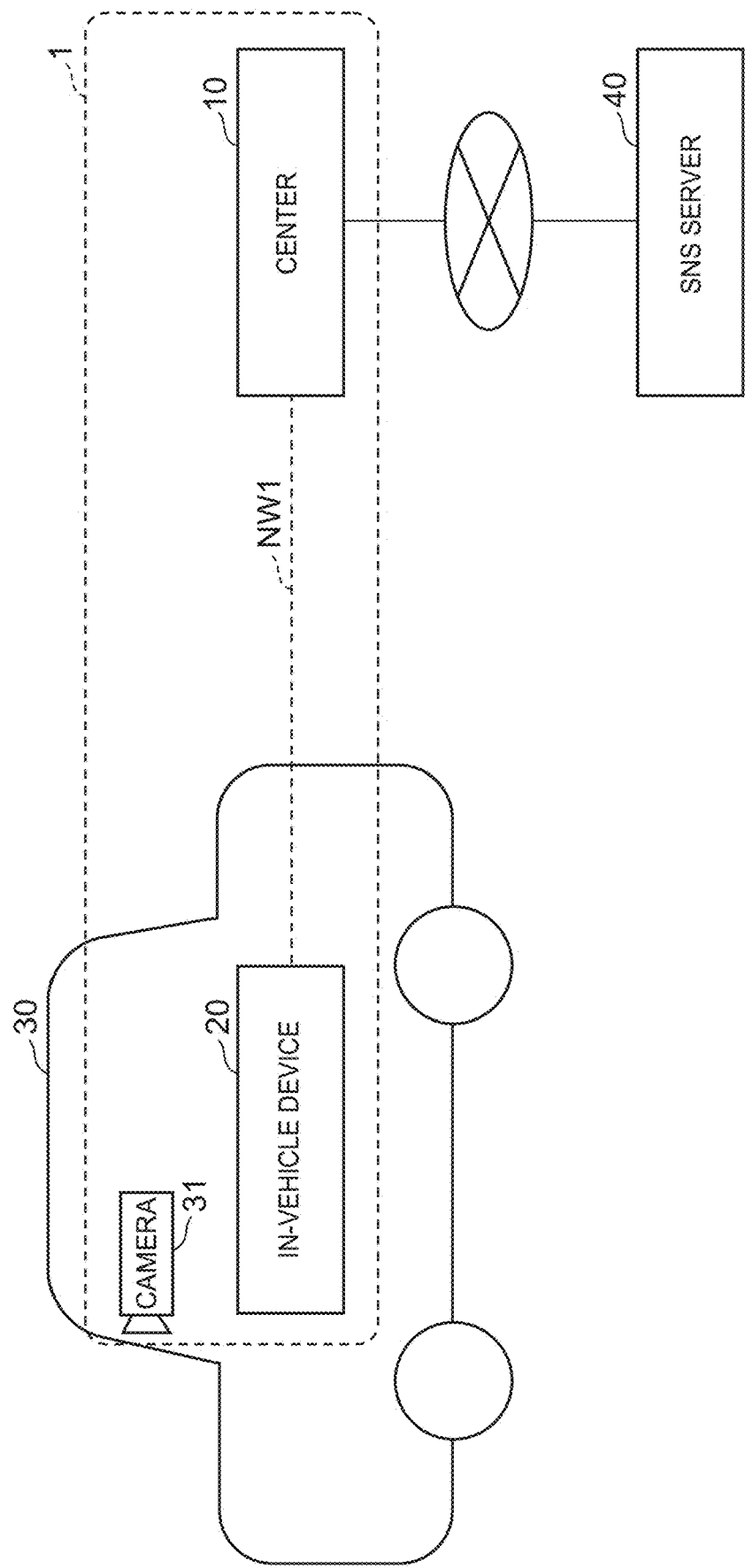
FIG. 1 is a diagram that shows an example of the configuration of an information processing system according to an embodiment of the disclosure.

Hereinafter, an embodiment of the disclosure will be described with reference to the accompanying drawings. FIG. 1 is a diagram that shows an example of the configuration of an information processing system 1 according to the embodiment of the disclosure. As shown in FIG. 1, the information processing system 1 includes in-vehicle devices 20 and a center 10. Each in-vehicle device 20 and the center 10 are able to communicate with each other via a predetermined communication network NW1. The predetermined communication network NW1 includes a mobile communication network, the Internet, and other communication networks. The mobile communication network is a wireless communication network having a large number of base stations as terminals. In FIG. 1, for the sake of convenience, only one in-vehicle device 20 is shown; however, the in-vehicle device 20 of each of a plurality of vehicles 30 is configured to be able to communicate with the center 10 via the network NW1.

Each vehicle 30 is, for example, a hybrid vehicle (HV), a plug-in hybrid vehicle (PHV), an electric vehicle (EV), a gasoline vehicle, a diesel vehicle, or a vehicle of another type. A camera 31 is mounted on each vehicle 30. The camera 31 is able to capture an image ahead in a traveling direction of the vehicle 30. The camera 31 is, for example, disposed at an upper center (near an inner mirror) of a front windshield in a vehicle cabin.

The in-vehicle device 20 is disposed at a center console of the vehicle 30, and has an information processing function and a communication function. For example, the in-vehicle device 20 may include a navigation system. In the present embodiment, the in-vehicle device 20 transmits location information about a current location of the vehicle 30 to the center 10. The in-vehicle device 20 also receives recommendation information on a current location of the vehicle 30. The recommendation information is transmitted from the center 10 based on the location information. The recommendation information on a current location of the vehicle 30 is information that indicates a spot that is estimated to suit a preference of an occupant, such as a driver, of the vehicle 30 (hereinafter, referred to as vehicle user) out of spots, such as facilities around the current location. The recommendation information may be information that indicates not only a facility around the current location but also a spot of a sightseeing area or a spot of a shop. The recommendation information is an example of visit history information that indicates a visit history of a user of a social networking service (SNS) (hereinafter, referred to as SNS user). The details of the recommendation information will be described later.

As the vehicle 30 reaches a location indicated by the visit history of the SNS user, included in the recommendation information, the in-vehicle device 20 causes the camera 31 to capture an image and acquires the image. The details of a process that the in-vehicle device 20 executes will be described later.

The center 10 is a collection of one or more computers (information processing devices). In the present embodiment, the center 10 receives location information from the in-vehicle device 20 of each vehicle 30, and transmits recommendation information on a location associated with the location information to the corresponding in-vehicle device 20.

As shown in FIG. 1, the center 10 is connected to a social media server (SNS server) 40 via a network, such as the Internet. The SNS server 40 includes one or more computers that provide a social networking service (SNS). The SNS server 40 stores user information of SNS user, and the like. Various posts posted by SNS users, comments on posts from other SNS users, and the like, are uploaded to the SNS server 40. Some of various posts include posts each including information that indicates a spot (place) that an SNS user has visited (hereinafter, referred to as posted spot information). The posted spot information is utilized by the center 10 to generate recommendation information. Specifically, the center 10 utilizes all or part of posted spot information from a person of which a preference has a degree of similarity higher by a predetermined degree or above with a preference of a vehicle user from which location information is transmitted out of a posted spot information group as the recommendation information.

The recommendation information is information that indicates a history of spots that an SNS user of which a preference has a degree of similarity higher by the predetermined degree or above with a preference indicated by preference information of the vehicle user has visited (visited places). The history of visited places includes the locations (latitudes and longitudes) of visited places, the names of facilities, or the like, in the visited places, the genres of the facilities, or the like, and visited dates and times. The locations, the names of facilities, or the like, the genres of the facilities, or the like, and visited dates and times are, for example, indicated by point of interest (POI) information. The preference information of the vehicle user may include the group (community) which the vehicle user belongs. The preference information of the vehicle user may be acquired based on a post which the vehicle user made a comment, the user information, and the like.

Examples of the person of which a preference has a degree of similarity higher by the predetermined degree or above with the preference of the vehicle user include an SNS user who made a friendship with the vehicle user out of SNS users, and an SNS user who belongs to the same group (same community) as the vehicle user in the SNS. Alternatively, examples of the person having a relationship with the vehicle user may include an SNS user who has ever made a comment on a post of the vehicle user and an SNS user who has ever received a comment from the vehicle user in the SNS. This is because these SNS users presumably have a preference having a high degree of similarity with the preference of the vehicle user. Here, SNS users are defined as SNS users who made a friendship with the vehicle user.

Figure 2:
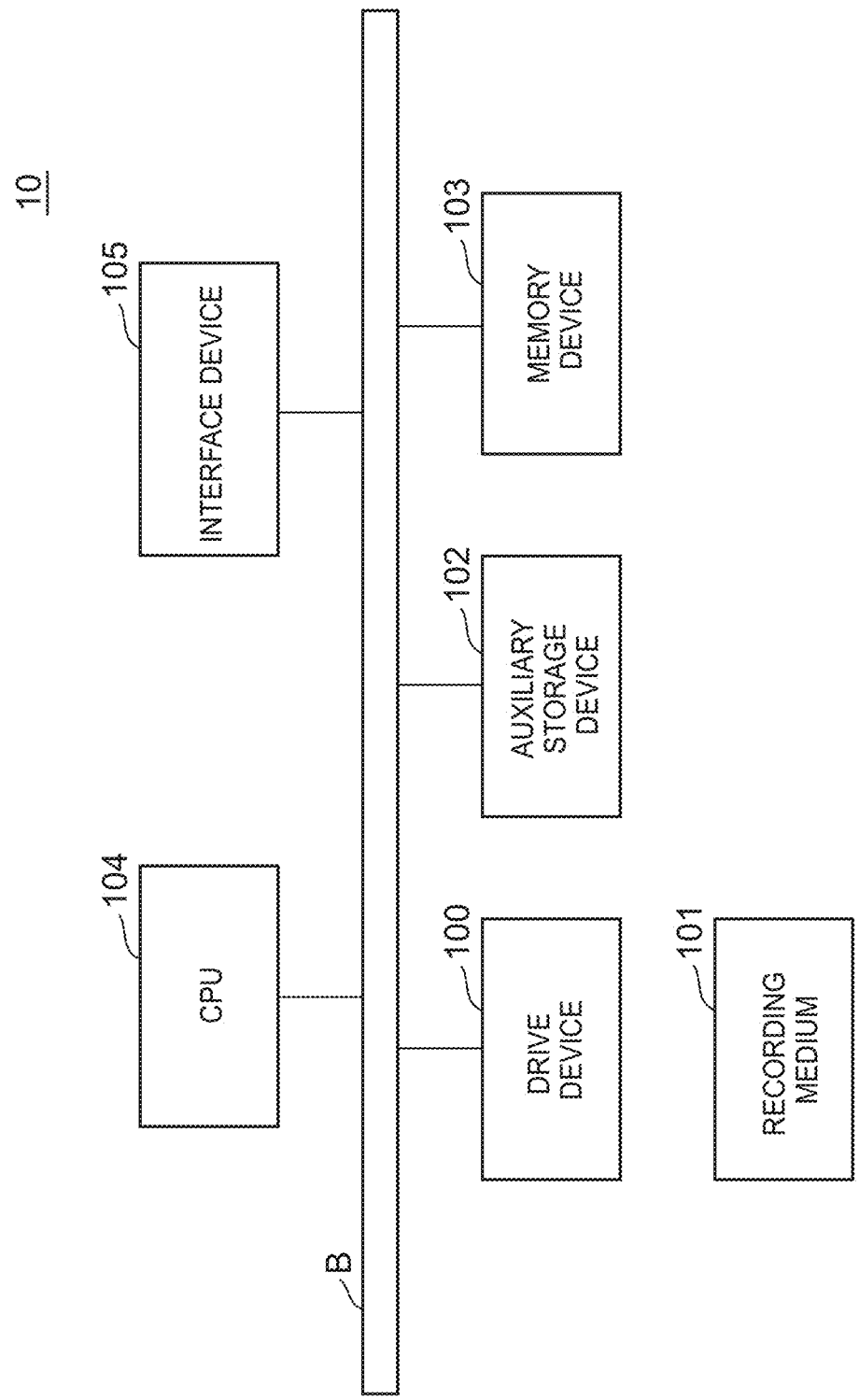
FIG. 2 is a block diagram that shows an example of the hardware configuration of a center according to the embodiment of the disclosure.

FIG. 2 is a block diagram that shows an example of the hardware configuration of the center 10 according to the embodiment of the disclosure. The center 10 shown in FIG. 2 includes a drive device 100, an auxiliary storage device 102, a memory device 103, a CPU 104, an interface device 105, and the like, that are connected to one another by a bus B.

A program that implements processes in the center 10 is provided by a recording medium 101, such as a CD-ROM. As the recording medium 101 on which the program is stored is inserted in the drive device 100, the program is installed from the recording medium 101 into the auxiliary storage device 102 via the drive device 100. However, the program does not always need to be installed by using the recording medium 101. Instead, the program may be downloaded from another computer via the network. The auxiliary storage device 102 stores the installed program and also stores necessary files, data, and the like.

When instructions to launch the program have been issued, the memory device 103 loads the program from the auxiliary storage device 102 and stores the program. The CPU 104 executes functions associated with the center 10 in accordance with the program stored in the memory device 103. The interface device 105 is used as an interface for connection with the network.

Figure 3:
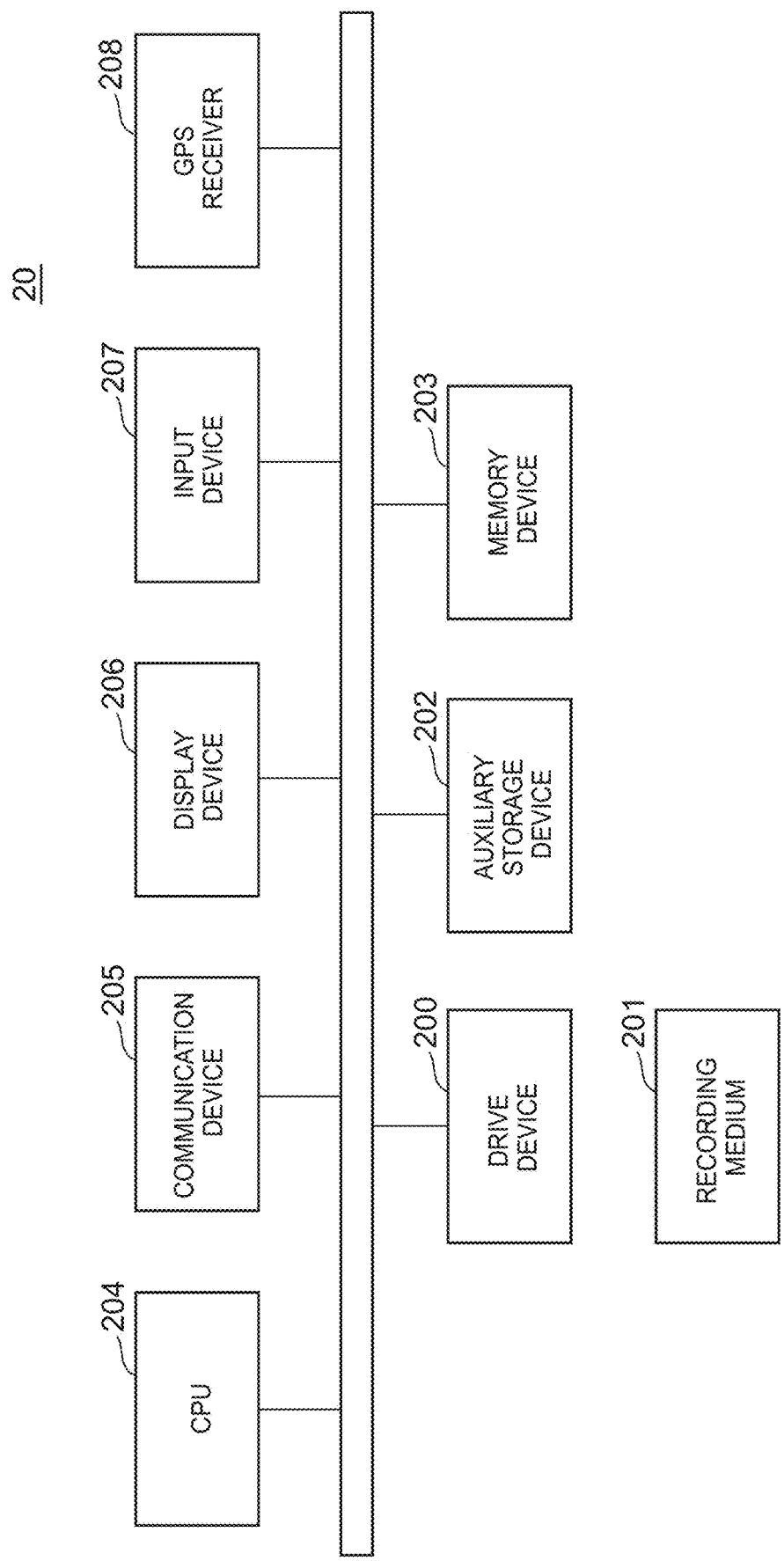
FIG. 3 is a block diagram that shows an example of the hardware configuration of each in-vehicle device according to the embodiment of the disclosure.

FIG. 3 is a block diagram that shows an example of the hardware configuration of each in-vehicle device 20 according to the embodiment of the disclosure. The in-vehicle device 20 shown in FIG. 3 includes a drive device 200, an auxiliary storage device 202, a memory device 203, a CPU 204, a communication device 205, a display device 206, an input device 207, a GPS receiver 208, and the like.

A program that implements processes in the in-vehicle device 20 is provided by a recording medium 201, such as an SD memory card. As the recording medium 201 on which the program is stored is inserted in the drive device 200, the program is installed from the recording medium 201 into the auxiliary storage device 202 via the drive device 200. However, the program does not always need to be installed by using the recording medium 201. Instead, the program may be downloaded from another computer via the network. The auxiliary storage device 202 stores the installed program and also stores necessary files, data, and the like.

When instructions to launch the program have been issued, the memory device 203 loads the program from the auxiliary storage device 202 and stores the program. The CPU 204 implements functions associated with the in-vehicle device 20 in accordance with the program stored in the memory device 203. The communication device 205 is a device for connection with the network by wireless communication. The communication device 205 may be realized by using, for example, a data communication module (DCM). Examples of the display device 206 include a liquid crystal display. The display device 206 displays a graphical user interface (GUI), or the like, based on the program. For the purpose of easy viewing of the vehicle user, the liquid crystal display of the display device 206 is disposed so as to be exposed from the center console. The input device 207 is used to allow the user to input various operating instructions. For example, the input device 207 may be a touch panel. The GPS receiver 208 acquires location information indicating a location of the vehicle 30. Specifically, the GPS receiver 208 receives GPS signals that are transmitted from global positioning system (GPS) satellites, and measures a current location (latitude and longitude) of the vehicle 30 based on the GPS signals.

In the in-vehicle device 20, the drive device 200, the auxiliary storage device 202, the memory device 203, the CPU 204, the display device 206, and the input device 207, other than the communication device 205 or the GPS receiver 208, are components of a display control unit (DCU). The DCU is a kind of electronic control unit (ECU).

Figure 4:
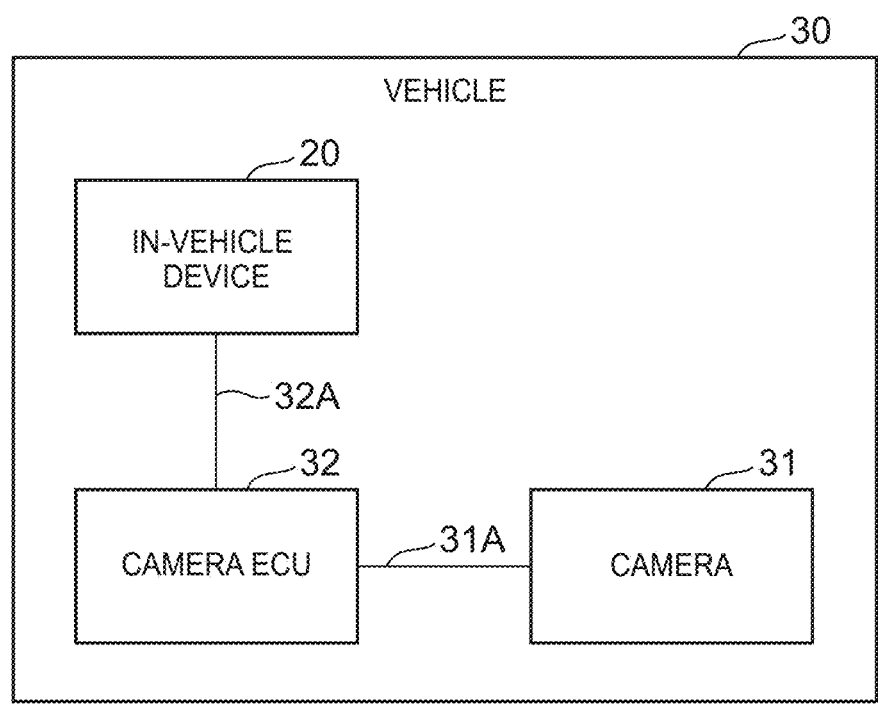
FIG. 4 is a block diagram that shows a connection relation among the in-vehicle device, a camera and a camera ECU according to the embodiment of the disclosure.

FIG. 4 is a block diagram that shows a connection relation among the in-vehicle device 20, the camera 31 and a camera ECU 32 according to the embodiment of the disclosure.

The in-vehicle device 20 is connected to the camera ECU 32 via a bus 32A. The camera ECU 32 is realized by a computer including a central processing unit (CPU), a random access memory (RAM), a read only memory (ROM), a hard disk drive (HDD), an input/output interface, a communication interface, an internal bus, and the like.

Figure 5:
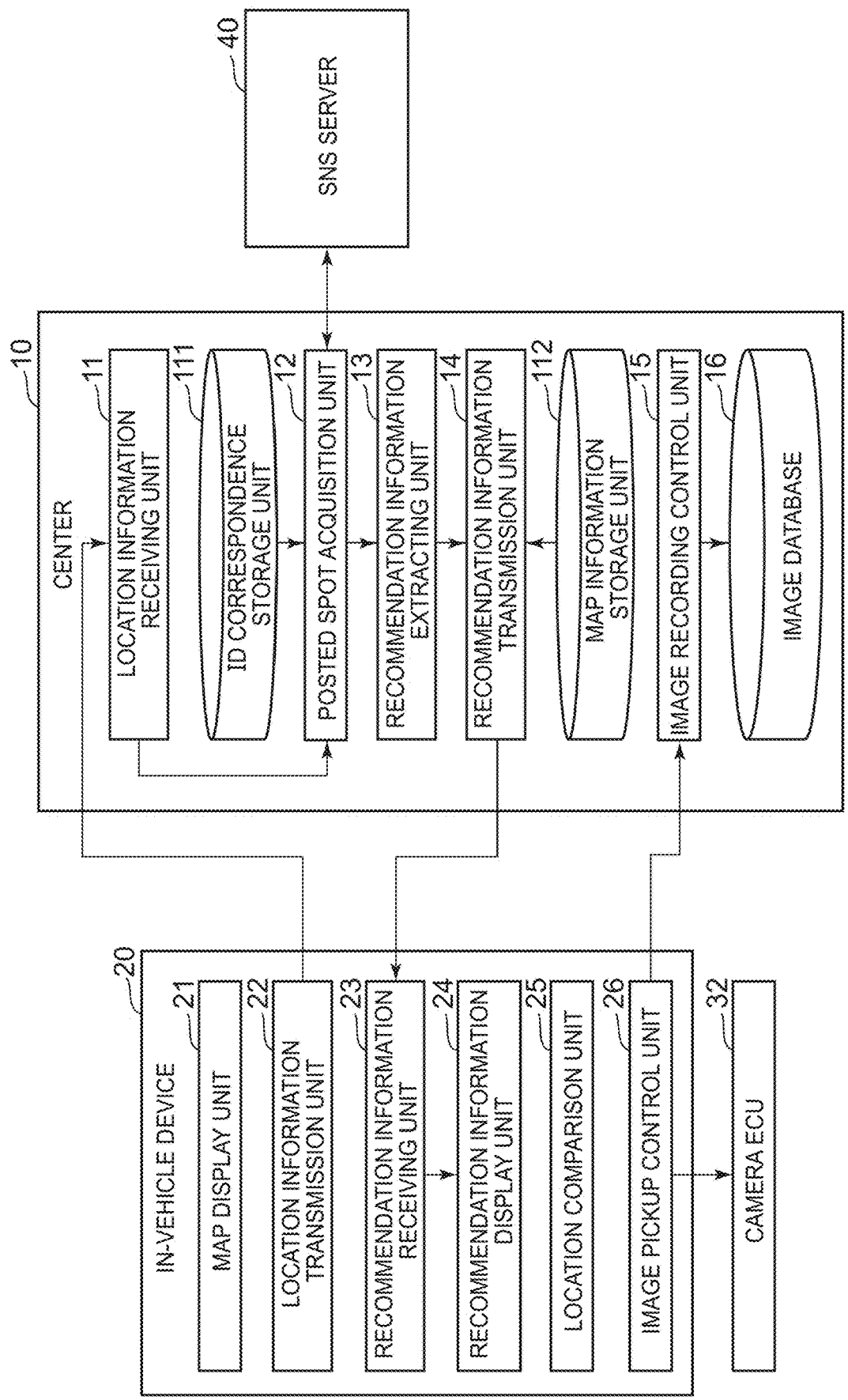
FIG. 5 is a block diagram that shows an example of the functional configuration of each in-vehicle device and an example of the functional configuration of the center according to the embodiment of the disclosure.

The camera ECU 32 executes image pickup control over the camera 31. The camera ECU 32 is connected to the camera 31 via, for example, a cable 31A. A camera that captures an image behind the vehicle 30 or an image lateral to the vehicle 30 may be connected to the camera ECU 32 in addition to the camera 31 that captures an image ahead. The camera ECU 32 is disposed, for example, inside the center console of the vehicle 30. FIG. 5 is a block diagram that shows an example of the configuration of each in-vehicle device 20 and an example of the configuration of the center 10 according to the embodiment of the disclosure. As shown in FIG. 5, each in-vehicle device 20 includes a map display unit 21, a location information transmission unit 22, a recommendation information receiving unit 23, a recommendation information display unit 24, a location comparison unit 25, an image pickup control unit 26, and the like. These units are implemented by processes that one or more programs installed on the in-vehicle device 20 cause the CPU 204 to execute. The camera ECU 32 is connected to the in-vehicle device 20 via a bus.

The map display unit 21 displays a map around a current location of the vehicle 30 (in-vehicle device 20) or a map around a location specified by the vehicle user on the display device 206. The location information transmission unit 22 transmits location information about the current location of the vehicle 30 (in-vehicle device 20) and a vehicle ID to the center 10. The recommendation information receiving unit 23 receives, from the center 10, recommendation information that the center 10 acquires based on, for example, the location information transmitted by the location information transmission unit 22. The location comparison unit 25 compares the current location with the visited place included in the recommendation information received by the recommendation information receiving unit 23. As a distance between the current location and the visited place compared by the location comparison unit 25 becomes shorter than or equal to a predetermined distance D2, the recommendation information display unit 24 displays the recommendation information received by the recommendation information receiving unit 23 on the display device 206. The predetermined distance D2 is an example of a second predetermined distance, and is, for example, 3 km. As the distance between the current location and the visited place compared by the location comparison unit 25 becomes shorter than or equal to a predetermined distance D1, the image pickup control unit 26 causes the camera ECU 32 to capture an image with the use of the camera 31 until the current location of the vehicle 30 passes through the visited place. The predetermined distance D1 is an example of a first predetermined distance, and is shorter than the predetermined distance D2. The predetermined distance D1 is, for example, 15 m. As the distance between the current location and the visited place compared by the location comparison unit 25 becomes shorter than or equal to 5 m, the image pickup control unit 26 extracts an image that is acquired by the camera 31 and records the image on the recording medium 201 (see FIG. 2) before the current location passes through the visited place. As accessory power is turned off, the image pickup control unit 26 transmits the image data recorded on the recording medium 201 to the center 10. The details of such a process will be described later with reference to FIG. 10.

The center 10 includes a location information receiving unit 11, a posted spot acquisition unit 12, a recommendation information extracting unit 13, a recommendation information transmission unit 14, an image recording control unit 15, an image database 16, and the like. These units except the image database 16 are implemented by processes that one or more programs installed on the center 10 cause the CPU 104 to execute. The image database 16 shows a section that is utilized as the image database 16 in the auxiliary storage device 102 of the center 10.

The center 10 utilizes an ID correspondence storage unit 111, a map information storage unit 112, and the like. These storage units may be realized by using, for example, the auxiliary storage device 102, a storage device that is connectable to the center 10 via the network, or the like.

The location information receiving unit 11 receives location information and a vehicle ID that are transmitted from each in-vehicle device 20. The posted spot acquisition unit 12 acquires, from the SNS server 40, one or more pieces of posted spot information, posted by an SNS user having a relationship on the SNS with the vehicle user associated with the vehicle ID received by the location information receiving unit 11. The recommendation information extracting unit 13 extracts posted spot information as recommendation information from the posted spot information acquired by the posted spot acquisition unit 12. Since the recommendation information is an example of visit history information that indicates a visit history, the recommendation information extracting unit 13 may be regarded as a processing unit that acquires a visit history. Since the recommendation information extracting unit 13 acquires location information about a visited place included in a visit history, the recommendation information extracting unit 13 may be regarded as a location information acquisition unit. The recommendation information transmission unit 14 transmits the recommendation information extracted by the recommendation information extracting unit 13 to the in-vehicle device 20 from which the location information is transmitted.

A user ID of a vehicle user associated with a vehicle ID on the SNS is stored in the ID correspondence storage unit 111 for each vehicle ID. Map information that is utilized in the navigation system, and the like, is stored in the map information storage unit 112. POI information including a POI ID, a name, a category (genre), location information (latitude and longitude), and the like, is included in the map information for each POI, such as a shop and a facility.

The image recording control unit 15 executes a process of recording image data in the image database 16. The image data are transmitted from the image pickup control unit 26 of each in-vehicle device 20. The image data are associated with a corresponding vehicle ID and recorded in the image database 16 by the image recording control unit 15.

Figure 6:
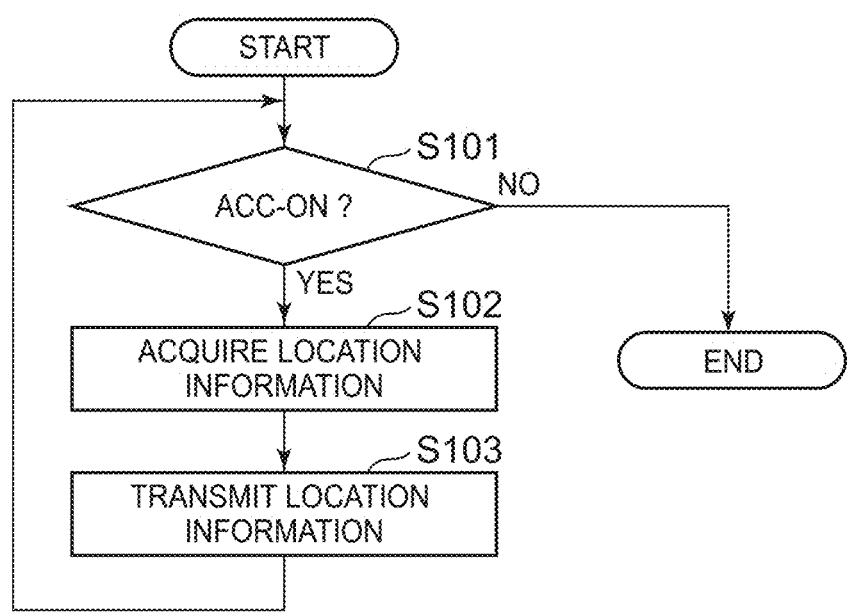
FIG. 6 is a flowchart for illustrating an example of the procedure of a location information transmission process that the in-vehicle device executes.

Hereinafter, a procedure that is executed on the information processing system 1 will be described. FIG. 6 is a flowchart for illustrating an example of the procedure of a location information transmission process that each in-vehicle device 20 executes.

For example, as the accessory power of the vehicle 30 is turned on by an operation of the vehicle user (Yes in S101), the location information transmission unit 22 acquires the location information (latitude and longitude) of the current location of the vehicle 30 from the GPS receiver 208 (S102). Subsequently, the location information transmission unit 22 transmits the location information to the center 10 (S103). At this time, the location information includes identification information of the vehicle user (hereinafter, referred to as vehicle ID). The vehicle ID may be an ID for each vehicle 30. Step S102 and step S103 are repeated until, for example, the accessory power turns off (No in S101).

The location information may be transmitted at predetermined intervals. The predetermined interval may be defined based on an elapsed time or may be defined based on a travel of the vehicle 30. That is, step S102 and step S103 are successively executed even while the vehicle 30 is traveling. Therefore, different location information is transmitted to the center 10 as the vehicle 30 travels.

Location information that indicates the location of the vehicle 30 at a time point at which a predetermined operation has been performed by the vehicle user via the input device 207 may be transmitted at that time point.

Figure 7:
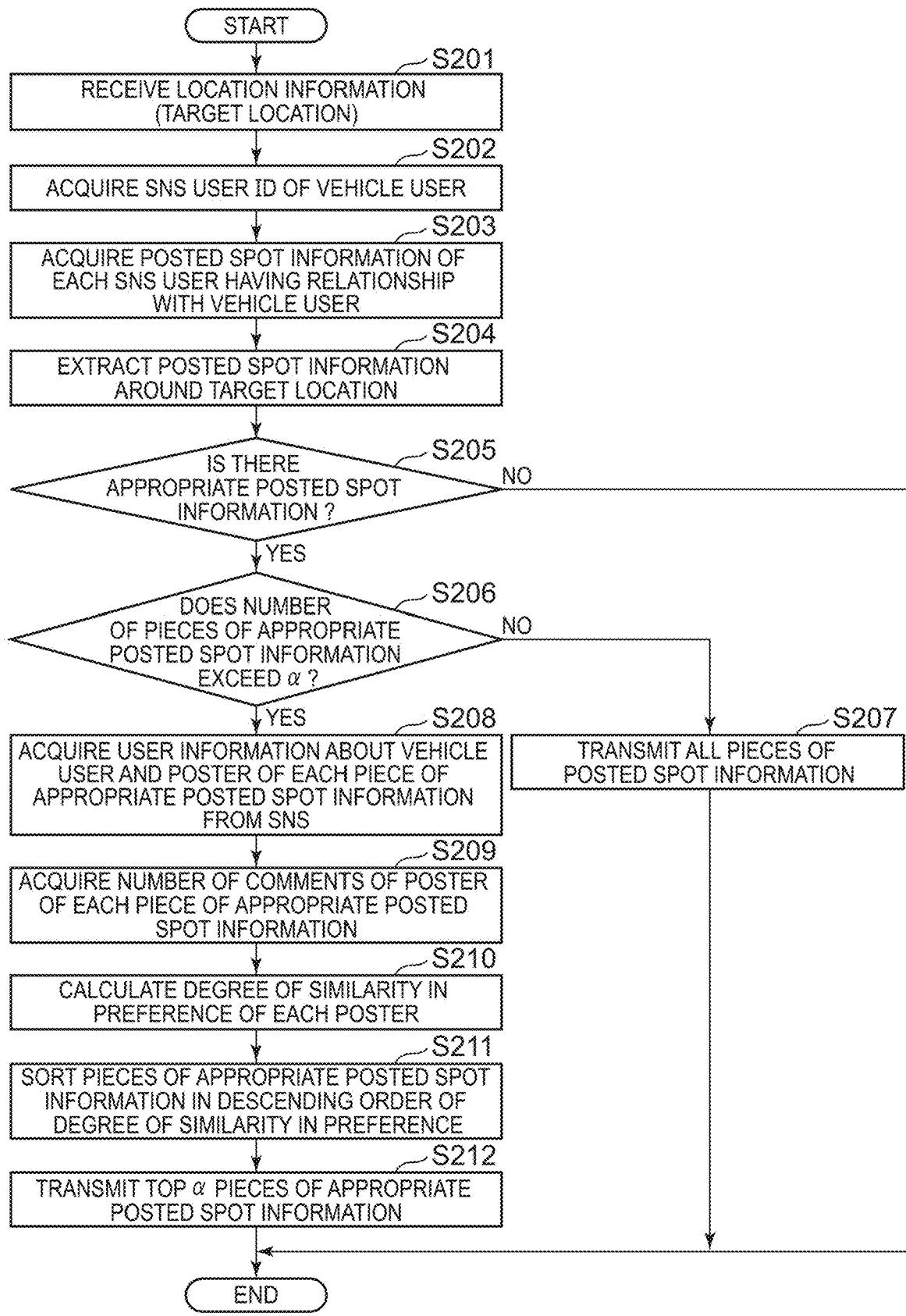
FIG. 7 is a flowchart for illustrating an example of the procedure that the center executes in response to reception of location information.

Subsequently, a procedure that the center 10 executes in response to reception of location information that is transmitted from any one of the vehicles 30 will be described. FIG. 7 is a flowchart for illustrating an example of the procedure that the center 10 executes in response to reception of location information. The procedure shown in FIG. 7 is executed each time location information is transmitted from any one of the vehicles 30.

As the location information receiving unit 11 receives (acquires) location information (S201), the posted spot acquisition unit 12 acquires a user ID on the SNS (hereinafter, referred to as SNS user ID) corresponding to a vehicle ID (hereinafter, referred to as target vehicle ID) assigned to the location information (hereinafter, referred to as vehicle location information) from the ID correspondence storage unit 111 (S202). That is, the target vehicle ID is converted to the SNS user ID.

FIG. 8 is a table that shows an example of the configuration of the ID correspondence storage unit 111. As shown in FIG. 8, an SNS user ID corresponding to a vehicle ID is stored in the ID correspondence storage unit 111 in association with the vehicle ID. An SNS user ID corresponding to a vehicle ID is a user ID that a user associated with the vehicle ID utilizes on the SNS. That is, a vehicle ID and an SNS user ID that are associated with each other are IDs for the same person. Hereinafter, the SNS user ID acquired in step S202 is referred to as target SNS user ID.

Subsequently, the posted spot acquisition unit 12 acquires, from the SNS server 40, a collection of one or more pieces of public posted spot information (hereinafter, referred to as posted spot information group) posted by one or more other SNS users having a relationship with the SNS user associated with the target SNS user ID (S203). For example, the posted spot acquisition unit 12 acquires, from the SNS server 40, SNS user IDs of one or more SNS user IDs having a relationship with the SNS user associated with the target SNS user ID. The posted spot acquisition unit 12 acquires, from the SNS server 40, posted spot information public to other people out of pieces of posted spot information posted in the past by the SNS users associated with the acquired SNS user IDs. The posted spot information public to other people is posted spot information that other people are permitted to see or browse by a poster. Opening posted spot information to the public is implemented by a function called check-in depending on an SNS; however, with what function posted spot information is open to the public varies with the type of SNS. The posted spot information to be acquired may be limited to posted spot information posted in a predetermined period from a current point in time back to the past. A method of acquiring a posted spot information group depends on an application program interface (API), or the like, that an SNS from which a posted spot information group is acquired opens to the public. Therefore, a posted spot information group may be acquired by a procedure other than the above procedure.

FIG. 9 is a table that shows an example of the posted spot information. As shown in FIG. 9, a piece of posted spot information includes, for example, values (data) of items, such as "SNS user ID", "name", "date and time", "location information", "spot name" and "accompanying information".

The item "SNS user ID" is an SNS user ID of an SNS user that is a poster of the posted spot information. The item "name" is a name of the SNS user. The item "date and time" is a date and time at which the posted spot information was posted. The item "location information" is location information (latitude and longitude) of a spot at which the posted spot information was posted. When posted spot information is posted by utilizing a portable terminal with a GPS function, such as a smartphone, the portable terminal is able to incorporate location information that is acquired with the GPS function into the posted spot information. The item "spot name" is a name of the spot (place, facility, or the like) at which the posted spot information was posted. The item "accompanying information" is a text message given by the poster, image data captured at the spot, or the like.

The configuration of posted spot information can vary with the type of SNS or a poster. Therefore, posted spot information having a configuration different from the configuration shown in FIG. 9 may be acquired. For example, posted spot information not including the item "spot name" may be acquired.

Subsequently, the recommendation information extracting unit 13 extracts posted spot information posted within a range around a location associated with vehicle location information (hereinafter, referred to as vehicle location) from the posted spot information group acquired by the posted spot acquisition unit 12 (S204). For example, posted spot information of which the location information falls within a range of a predetermined distance from the vehicle location in all directions, a range of shorter than or equal to a radius R km about the vehicle location, or the like, may be extracted. As a result, it is possible to exclude posted spot information about a spot remote from the vehicle location, so it is possible to extract posted spot information that is probably useful for the vehicle user. The value of the radius R km may be selected, and just needs to be a value longer than the predetermined distance D2 (for example, 3 km). This is because, as the distance between the current location and the visited place compared by the location comparison unit 25 becomes shorter than or equal to the predetermined distance D2, the recommendation information display unit 24 of the in-vehicle device 20 displays recommendation information received by the recommendation information receiving unit 23 on the display device 206.

When there is no extracted posted spot information (No in S205), the procedure shown in FIG. 7 ends. When one or more pieces of posted spot information have been extracted (Yes in S205), the recommendation information extracting unit 13 determines whether the number of the extracted pieces of posted spot information (hereinafter, referred to as recommendation candidate information) exceeds a predetermined threshold α. The value of the threshold α may be set to any value by an administrator, or the like, of the center 10 as long as the value prevents an enormous number of pieces of posted spot information from being transmitted to the in-vehicle device 20.

When the number of pieces of recommendation candidate information is smaller than or equal to the threshold α (No in S206), the recommendation information transmission unit 14 transmits all the pieces of recommendation candidate information to the in-vehicle device 20 from which vehicle location information is transmitted (S207). That is, in this case, all the extracted pieces of posted spot information are set for recommendation information.

On the other hand, when the number of pieces of recommendation candidate information exceeds the threshold α (Yes in S206), the recommendation information extracting unit 13 acquires user information of the vehicle user and user information of the poster of each piece of recommendation candidate information from the SNS server 40 (S208). That is, the recommendation information extracting unit 13 acquires user information corresponding to the target SNS user ID and user information corresponding to an SNS user ID of each piece of recommendation candidate information from the SNS server 40. The user information is information that is managed on the SNS server 40 as attribute information of an SNS user. The user information includes, for example, age, sex, a group name, a place of work, an industry, an address, a birth region, a graduated university, a hobby, and the like. The group name is the name of a group (community) that is formed on the SNS. The place of work is the name of a corporation, or the like, of a place of work of an SNS user. The industry is an industry to which the place of work of an SNS user belongs. The address is the home address of an SNS user. The birth region is the name of a home prefecture of an SNS user. The graduated university is the name of a graduated university of an SNS user. The hobby is the hobby of an SNS user. Of pieces of user information to be acquired, user information of a target SNS user (that is, the vehicle user associated with the in-vehicle device 20 from which location information is transmitted) is referred to as vehicle user information below, and the other user information (that is, user information of a poster of recommendation candidate information) is referred to as related user information below.

Subsequently, the recommendation information extracting unit 13 acquires, from the SNS server 40, the number of posted comments on a post to the SNS by the vehicle user (hereinafter, referred to as the number of comments) for each SNS user associated with the related user information (S209). Since comments from other SNS users on a post of each SNS user are managed on the SNS server 40, it is possible to easily acquire the number of comments.

Subsequently, the recommendation information extracting unit 13 calculates a degree of similarity in preference with the vehicle user for the SNS user that is the poster of each piece of recommendation candidate information (that is, the SNS user associated with each piece of related user information) based on the vehicle user information, the pieces of related user information, and the number of comments of the poster of each piece of recommendation candidate information (S210).

The degree of similarity in preference is an index that indicates a degree to which a preference is similar or common, and indicates that a similarity or commonality in preference becomes higher as the value increases. For example, a degree of similarity in preference for an SNS user is calculated by using the following mathematical expression (1).

(Degree of similarity in preference)=w1×(Number of comments)+w2×(Common place of work term)+ w3×(Common industry term)+w4×(Common living region term)+w5×(Common sex term)+ w6×(Common generation term)  (1)

Here, the common place of work term is one when the place of work is the same as that of the vehicle user, and is zero when the place of work is different from that of the vehicle user. The common industry term is one when the industry is the same as that of the vehicle user, and is zero when the industry is different from that of the vehicle user. The common living region term is one when the prefecture name of the address is the same as that of the vehicle user, and is zero when the prefecture name of the address is different from that of the vehicle user. The common sex term is one when the sex is the same as that of the vehicle user, and is zero when the sex is different from that of the vehicle user. The common generation term is one when the generation is the same as that of the vehicle user, and is zero when the generation is different from that of the vehicle user. The condition that the generation is the same may be, for example, the condition that the tenths places of the ages coincide with each other or may be the condition that a difference between the age of one and the age of the other falls within a predetermined value (for example, within 10). Here, w1 to w6 are weighting factors. The weighting factors just need to be selected.

According to the mathematical expression (1), as the number of comments increases, the degree of similarity in preference becomes higher. This means that a degree of similarity in preference is calculated based on a history of conversation (communication) on the SNS. This is because, as the number of times of conversation (communication) on the SNS increases, it is presumable that preferences are probably similar or common to each other. In other words, this is because it is presumable that the number of times of conversation (communication) on the SNS increases since the preferences are similar or common to each other. The number of comments may be a value in a predetermined period back from a current point in time to the past or may be a value in all the period in the past.

According to the mathematical expression (1), as the attribute of the SNS user, such as a place of work, an industry, a living region (address), sex and a generation, becomes more similar or common, the degree of similarity in preference becomes higher. This is because people having a high similarity or commonality in attribute to each other presumably tend to have a similar or common preference.

Whether the place of work is the same, whether the industry is the same, whether the prefecture name of the address is the same, whether the sex is the same and whether the generation is the same are determined by comparing vehicle user information with related user information.

The common living region term and the common generation term may not always be zero or one. For example, the common living region term may be a value based on the number of characters at a common part of the addresses. The common generation term may be a value based on the inverse of a difference in age.

Another term may be added. For example, whether the uses are family, whether the users have a common hobby, or the like, may be reflected by a degree of similarity in preference. Whether the users are family may be determined based on whether the addresses are the same.

Subsequently, the recommendation information extracting unit 13 sorts the pieces of recommendation candidate information in descending order of the degree of similarity in preference, calculated for the poster of each piece of the recommendation candidate information (S211). Subsequently, the recommendation information transmission unit 14 transmits the top a pieces of recommendation candidate information in the sort order to the in-vehicle device 20 from which the vehicle location information is transmitted (S212). That is, the top a pieces of recommendation candidate information are used as the recommendation information. Here, the degree of similarity in preference is an index that indicates a similarity in preference. Therefore, since the pieces of recommendation candidate information having a higher degree of similarity in preference are used as the recommendation information, it is expected to provide recommendation information that the vehicle user probably interests.

At the timing of step S207 or the timing of step S211, when there is a piece of recommendation information not including the spot name out of the pieces of recommendation information to be transmitted, the recommendation information transmission unit 14 may identify the spot name by consulting the map information storage unit 112, and may provide the spot name to the recommendation information. For example, the recommendation information transmission unit 14 may acquire, from the map information storage unit 112, POI information corresponding to location information of recommendation information not including a spot name, and may provide a name included in the POI information to the recommendation information as a spot name.

Figure 10:
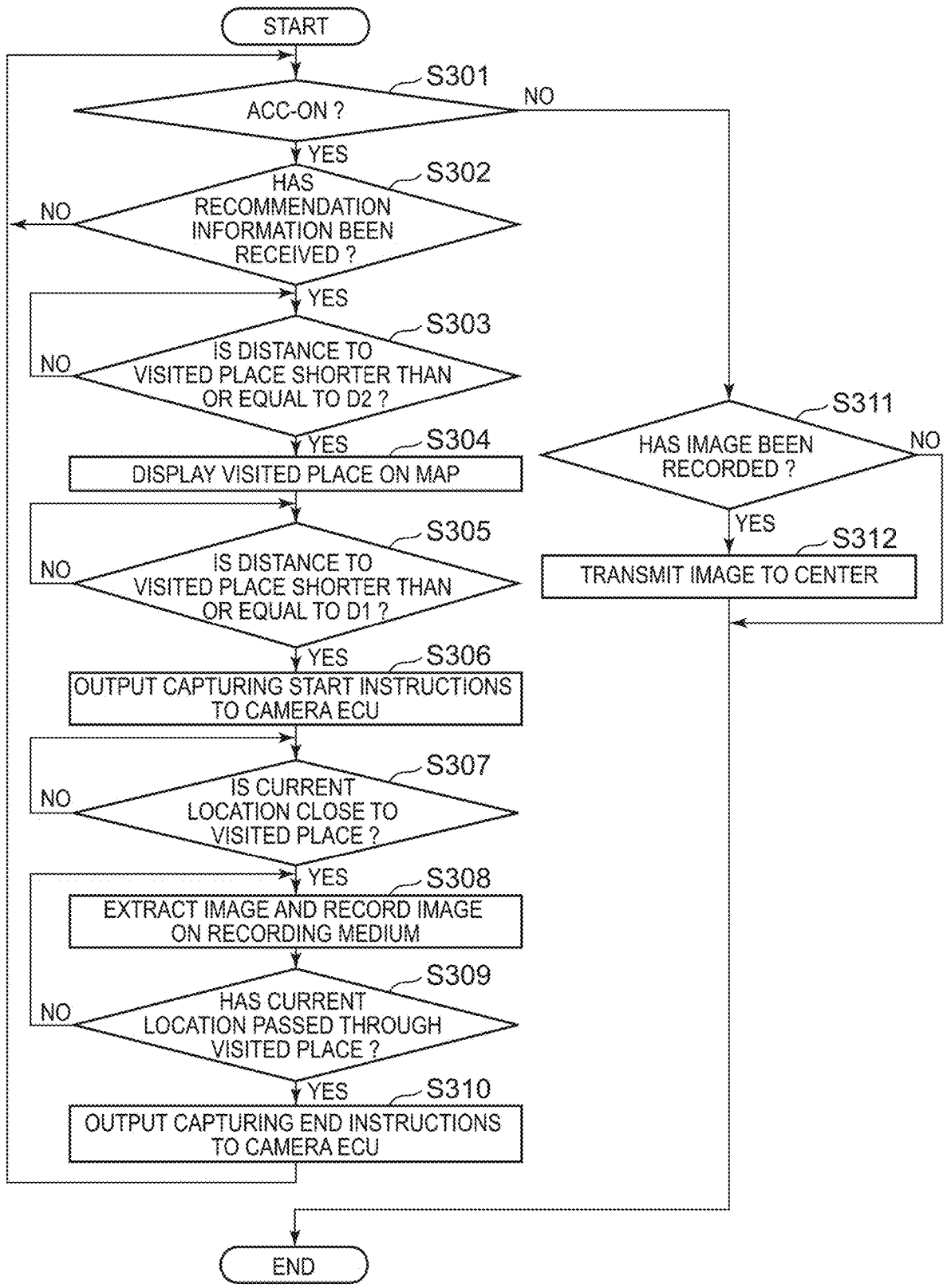
FIG. 10 is a flowchart for illustrating an example of the procedure that the in-vehicle device executes in response to reception of recommendation information.

Subsequently, the procedure that the in-vehicle device 20 executes in response to reception of recommendation information will be described. FIG. 10 is a flowchart for illustrating an example of the procedure that the in-vehicle device 20 executes in response to reception of recommendation information.

As the accessory power of the vehicle 30 is turned on by an operation of the vehicle user (Yes in S301), the recommendation information receiving unit 23 waits for reception of recommendation information from the center 10 (S302). As the recommendation information receiving unit 23 receives recommendation information transmitted from the center 10 (Yes in S302), the location comparison unit 25 compares the current location with the visited place included in the recommendation information received by the recommendation information receiving unit 23, and determines whether a distance between the visited place and the current location is shorter than or equal to the predetermined distance D2 (S303). The predetermined distance D2 is, for example, 3 km. When the location comparison unit 25 determines that the distance is not shorter than or equal to the predetermined distance D2 (No in S303), the location comparison unit 25 repeatedly executes the process of step S303 until the distance becomes shorter than or equal to the predetermined distance D2.

When the location comparison unit 25 determines that the distance is shorter than or equal to the predetermined distance D2 (Yes in S303), the recommendation information display unit 24 displays the visited place of the SNS user included in the recommendation information received by the recommendation information receiving unit 23 on a map that is displayed on the display device 206 (see FIG. 3) by the map display unit 21 in a superimposed manner (S304).

Step S302 is repeated until, for example, the accessory power turns off (No in S301).

Figure 11:
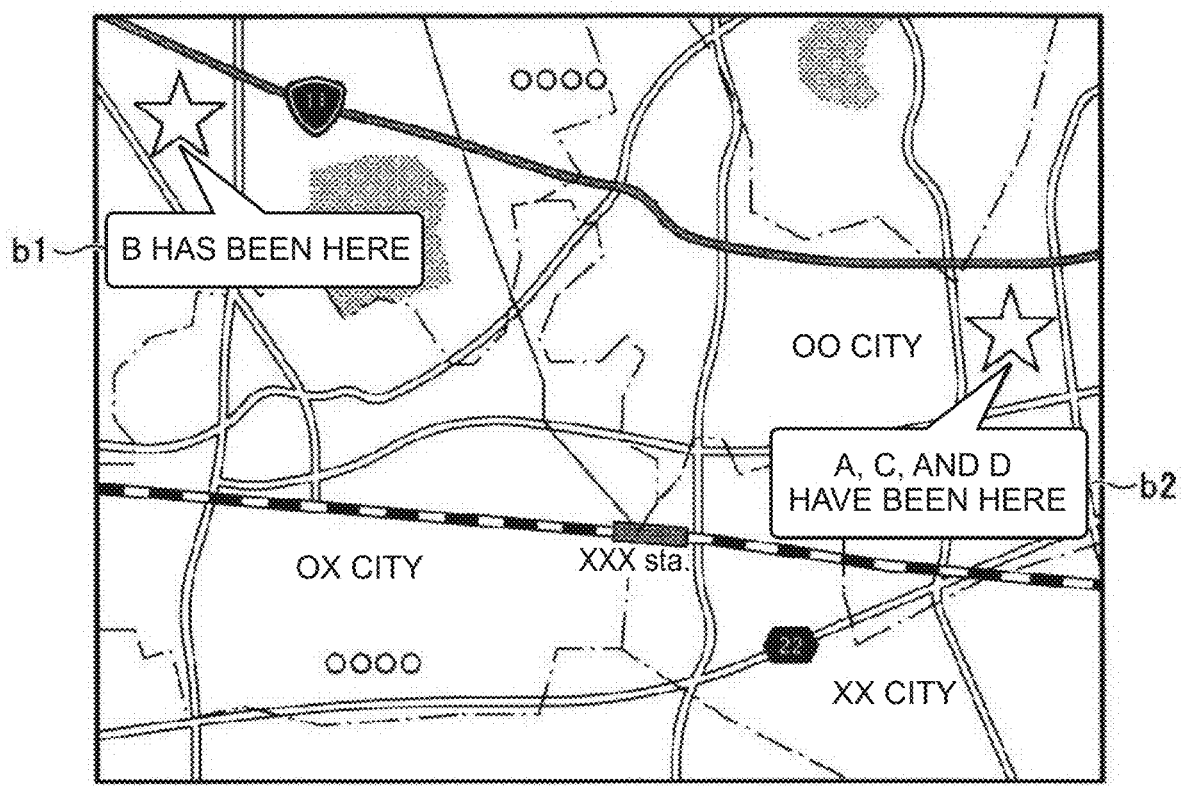
FIG. 11 is a view that shows an example of display of the pieces of recommendation information.

FIG. 11 is a view that shows an example of display of pieces of recommendation information. As shown in FIG. 11, each piece of recommendation information is, for example, displayed on the map that is displayed on the display device 206 by the map display unit 21 in association with the location of a POI corresponding to the location information or spot name of the recommendation information. In the example of FIG. 11, predetermined graphic symbols (open stars in FIG. 11) are superimposed at the locations of POIs corresponding to the pieces of recommendation information on the map, and messages "XXX has/have been here." are respectively displayed in a balloon b1 and a balloon b2 for the predetermined graphic symbols. Here, the name included in a corresponding piece of recommendation information is applied to "XXX". As in the case of the balloon b2, pieces of recommendation information, corresponding to the same POI, may be collectively displayed in one balloon.

The vehicle user is allowed to enjoy driving, that is, stop by a spot associated with recommendation information displayed as shown in FIG. 11 or select the spot for a destination by consulting the recommendation information.

A display mode of recommendation information is not limited to the display mode shown in FIG. 11. For example, the recommendation information display unit 24 may display a list of pieces of recommendation information received by the recommendation information receiving unit 23 at a predetermined position on the display device 206 of the in-vehicle device 20 in a menu form, or the like. Recommendation information selected by the vehicle user from among the list may be displayed as shown in FIG. 11. In this case, the sequence of display of the pieces of recommendation information in the list may be set in accordance with the sort order (that is, the descending order of a degree of similarity in preference) of step S211 of FIG. 7. For this purpose, the recommendation information transmission unit 14 of the center 10 may transmit the pieces of recommendation information to the in-vehicle device 20 in a state where the pieces of recommendation information are arranged in the sort order or a degree of similarity in preference may be assigned to each piece of recommendation information and then each piece of recommendation information may be transmitted to the in-vehicle device 20. FIG. 7 shows an example in which a degree of similarity in preference is calculated only when the number of pieces of recommendation candidate information exceeds the threshold α. Alternatively, even when the number of pieces of recommendation candidate information is smaller than or equal to the threshold α, step S207 may be executed after step S208 to step S211 are executed.

Accompanying information (a text message, image data, and the like) included in each piece of recommendation information may be displayed. For example, accompanying information of each piece of recommendation information shown in FIG. 11 or accompanying information of each piece of recommendation information selected by the vehicle user from among the list may be displayed. As a result, the vehicle user is allowed to obtain detailed information provided by other people having a relationship on the SNS with regard to a POI corresponding to a specific one of the pieces of recommendation information.

Subsequently, the location comparison unit 25 compares the current location with the visited place included in the recommendation information received by the recommendation information receiving unit 23, and determines whether a distance between the visited place and the current location is shorter than or equal to the predetermined distance D1 (S305). In this case, when there is a plurality of visited places, the location comparison unit 25 carries out determination as to a distance between each visited place and the current location. The predetermined distance D1 is, for example, 15 m. When the location comparison unit 25 determines that the distance is not shorter than or equal to the predetermined distance D1 for any visited place (No in S305), the location comparison unit 25 repeatedly executes the process of step S305 until the distance becomes shorter than or equal to the predetermined distance D1.

When the location comparison unit 25 determines that the distance is shorter than or equal to the predetermined distance D1 for any one of the visited places (Yes in S305), the image pickup control unit 26 outputs capturing start instructions to the camera ECU 32 (S306). Thus, the camera ECU 32 causes the camera 31 to capture an image. The camera 31 is caused to capture an image until the current location of the vehicle 30 passes through the visited place from which the distance becomes close to the predetermined distance D1 or shorter (approaching visited place).

Subsequently, the location comparison unit 25 compares the current location with the visited place that the vehicle 30 is approaching, and determines whether the current location is close to the approaching visited place (S307). Whether the current location is close to the approaching visited place is determined based on, for example, whether the distance between the current location and the approaching visited place is shorter than or equal to 5 m. When the location comparison unit 25 determines that the current location is not close to the approaching visited place (No in S307), the process of step S307 is repeatedly executed until the current location becomes close to the approaching visited place.

Subsequently, when the location comparison unit 25 determines that the current location is close to the approaching visited place (Yes in S307), the image pickup control unit 26 extracts an image acquired by the camera 31 at the current location, and records the image on the recording medium 201 (see FIG. 2) (S308).

Subsequently, the location comparison unit 25 compares the current location with the visited place near the vehicle 30, and determines whether the current location has passed through the visited place (S309). When the location comparison unit 25 determines that the vehicle 30 has not passed through the visited place (No in S309), the process returns to step S308.

In this way, as a result of repetition of step S308 and step S309, an image that is acquired by the camera 31 is extracted and is recorded on the recording medium 201 (see FIG. 2) in a period from when the location comparison unit 25 determines that the current location is close to the visited place (Yes in S307) to when the location comparison unit 25 determines that the current location has passed through the visited place (Yes in S309) (from when the current location becomes close to the visited place to when the current location passes through the visited place).

When the location comparison unit 25 determines that the current location has passed through the visited place (Yes in S309), the image pickup control unit 26 outputs capturing end instructions to the camera ECU 32 (S310). As a result, the camera ECU 32 causes the camera 31 to end capturing an image.

As the process of step S310 ends, the process returns to step S301.

As the accessory power is turned off (No in S301), the image pickup control unit 26 determines whether an image has been recorded on the recording medium 201 (see FIG. 2) (S311). This is because, when an image has been recorded on the recording medium 201 (see FIG. 2), the image is transmitted to the center 10.

When the image pickup control unit 26 determines that an image has been recorded (Yes in S311), the image pickup control unit 26 transmits the image recorded on the recording medium 201 (see FIG. 2) to the center 10 via the communication device 205 (see FIG. 3) (S312). The image transmitted from the image pickup control unit 26 (the in-vehicle device 20) is recorded on the auxiliary storage device 102 of the center 10. At this time, the image is recorded in association with the vehicle ID. The vehicle user is allowed to browse the image with a smartphone or a personal computer and download the image to the smartphone or the personal computer by utilizing an application for browsing the image recorded on the auxiliary storage device 102. Here, the image pickup control unit 26 may transmit to the smartphone or the personal computer of the vehicle user directly. The image pickup control unit 26 may transmit to the other server than the center 10 and the transmitted image may be recorded in the other server.

On the other hand, when the image pickup control unit 26 determines that no image has been recorded (No in S311), the image pickup control unit 26 ends the series of processes.

Here, the mode in which, as the accessory power is turned off (No in S301), the image pickup control unit 26 determines whether an image has been recorded on the recording medium 201 (see FIG. 2) (S311) and, when an image has been recorded on the recording medium 201 (Yes in S311), the image pickup control unit 26 transmits the image to the center 10 is described. However, the disclosure is not limited to this mode. For example, it may be periodically determined whether an image has been recorded, and, when an image has been recorded, the image is transmitted to the center 10.

Figure 12:
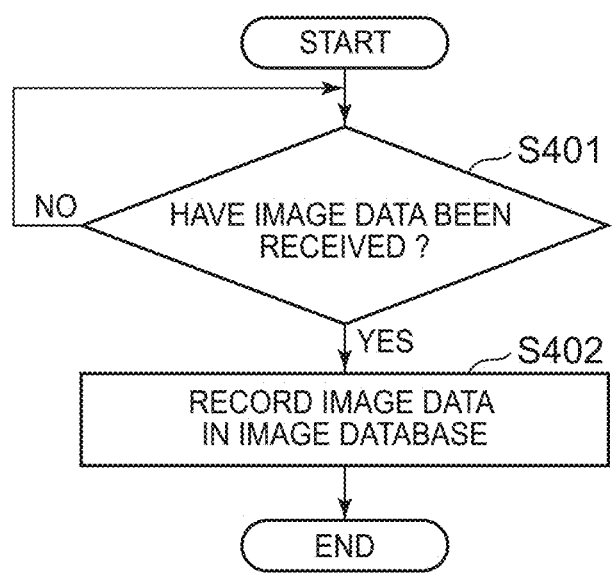
FIG. 12 is a flowchart that shows a process that the center stores an image in an auxiliary storage device.

FIG. 12 is a flowchart that shows a process in which the center 10 records an image on the auxiliary storage device 102. The process shown here is a process that is executed in accordance with the same program as the program of the process shown in FIG. 7, and is executed by the image recording control unit 15 of the center 10.

The image recording control unit 15 determines whether image data have been received from the in-vehicle device 20 (S401). When image data have been received (Yes in S401), the image recording control unit 15 records the received image data in the image database 16 (S402). When no image data have been received (No in S401), the image recording control unit 15 returns the process to step S401, and executes the process of step S401. The image recording control unit 15 executes the process of step S401 at intervals of a predetermined time. This is to periodically determine whether image data have been received.

As described above, the center 10 according to the embodiment transmits visit history information (recommendation information) indicating a visit history of the SNS user of which a preference has a high degree of similarity with the preference of the vehicle user to the in-vehicle device 20 mounted on the vehicle 30 of the vehicle user.

In the in-vehicle device 20 that has received the recommendation information, as the distance between the current location and the visited place compared by the location comparison unit 25 becomes shorter than or equal to the predetermined distance D2, the recommendation information display unit 24 displays the recommendation information received by the recommendation information receiving unit 23 on the display device 206. As a result, the vehicle user is allowed to recognize that the visited place of the SNS user having a similar preference to that of the vehicle user is located near the current location, and is allowed to be informed of the name of the SNS user by seeing the balloon b1 or balloon b2 displayed on the display device 206 as shown in FIG. 11. In this case, the vehicle user is allowed to drive toward the displayed visited place, and is allowed to visit the same visited place as the SNS user.

As the distance between the current location and the visited place becomes shorter than or equal to the predetermined distance D1, the image pickup control unit 26 outputs capturing start instructions to the camera ECU 32, and the camera 31 starts capturing an image. The camera 31 captures an image until the current location of the vehicle 30 passes through the visited place that the current location has approached at a distance shorter than or equal to the predetermined distance D1. For this reason, images from a spot at which the distance between the current location and the visited place becomes the predetermined distance D1 to when the current location passes through the visited place are acquired by the camera 31.

As the vehicle 30 reaches near the visited place, the image pickup control unit 26 extracts the image acquired by the camera 31 at the current location, and records the image on the recording medium 201 (see FIG. 2). For this reason, it is possible to automatically and reliably record a captured image of a visited place included in recommendation information on the recording medium 201, so it is possible to acquire image data that suit an own preference with the use of the camera 31 mounted on the vehicle 30 even when the vehicle user does not take an image.

Therefore, according to the embodiment, it is possible to provide the in-vehicle device 20, a control method for the in-vehicle device 20 and a control program for the in-vehicle device 20, which are able to acquire an image that suits a preference of a user of a vehicle.

Image data recorded on the recording medium 201 in the in-vehicle device 20 are transmitted to the center 10, and are recorded on the auxiliary storage device 102.

Therefore, according to the embodiment, it is possible to provide the center 10 (information processing device), the information processing system 1, an information processing method and an information processing program, which are able to acquire an image that suits a preference of a user of a vehicle.

The mode in which the image pickup control unit 26 of the in-vehicle device 20 transmits an image recorded on the recording medium 201 to the center 10 and the image is recorded on the auxiliary storage device 102 in association with a vehicle ID is described above. Alternatively, a mode in which the in-vehicle device 20 does not transmit an image to the center 10 and a vehicle user acquires an image recorded on the recording medium 201 may be employed. In this case, the center 10 does not need to execute the process of recording an image on the auxiliary storage device 102 in association with a vehicle ID.

The mode in which an SNS user is defined as an SNS user who made a friendship with a vehicle user is described. Instead, an SNS user may be an SNS user who has no friendship with a vehicle user. In such a case, an item that indicates whether the SNS user is a friend just needs to be included when a degree of similarity in preference is calculated. For example, a degree of similarity in preference just needs to be calculated by using the following mathematical expression (2).

$$\text{(Degree of similarity in preference)} = w1 \times \text{(Number of comments)} + w2 \times \text{(Common place of work term)} + w3 \times \text{(Common industry term)} + w4 \times \text{(Common living region term)} + w5 \times \text{(Common sex term)} + w6 \times \text{(Common generation term)} + w7 \times \text{(Friend term)} \quad (2)$$

Here, w7, as well as w1 to w6, is a weighting factor. The weighting factors just need to be selected. The friend term is one when an SNS user and a vehicle user are friends on social media, and is zero when an SNS user and a vehicle user are not friends on social media.

With the mathematical expression (2), it is possible to obtain a degree of similarity in preference with an item that indicates whether an SNS user and a vehicle user are friends on social media in addition to a place of work, an industry, a living region (address), sex and a generation. A degree of similarity in preference becomes higher as the attribute of an SNS user is more similar or common, and becomes higher when the SNS user is a friend. This is because people having a high similarity or commonality in attribute to each other presumably tend to have a similar or common preference and, furthermore, preferences presumably tend to be more similar or common when people are friends on social media than when people are not friends.

The example in which location information during traveling of the vehicle 30 is automatically transmitted to the center 10 and posted spot information about a spot around a location associated with the location information is a candidate for recommendation information is described. Alternatively, location information based on which posted spot information is extracted may be not limited to location information about the current location of the vehicle 30. For example, at the time when a vehicle user has set a destination by utilizing a navigation function of the in-vehicle device 20, the location information transmission unit 22 may transmit location information about the destination to the center 10 as location information to be processed in FIG. 7. As a result, the vehicle user is allowed to obtain recommendation information around a destination in advance.

The location information transmission unit 22 may transmit location information about a spot freely selected by a vehicle user on a map that is displayed by the map display unit 21 to the center 10 as location information to be processed in FIG. 7. As a result, the vehicle user is allowed to obtain recommendation information around a selected spot, and is allowed to obtain reference information, for example, at the time when the vehicle user is wavering to select a destination.

The example in which the in-vehicle device 20 is a terminal that receives recommendation information from the center 10 is described. Alternatively, the present embodiment may be applied to a terminal that is carried with a person, such as a smartphone and a tablet terminal. That is, these terminals may include the functional configuration of the in-vehicle device 20 shown in FIG. 5. In this case, the location information transmission unit 22 of each terminal may transmit, to the center 10, location information measured by a GPS function of the terminal, positional information about a destination selected by a user in a navigation application of the terminal, location information about a spot selected by a user in a map application of the terminal, or the like. A place name included in information stored in the terminal may be utilized. For example, when the terminal has a calendar function (schedule function) and a place name is included in a schedule entered into the calendar function, the location information transmission unit 22 of the terminal may transmit location information corresponding to the place name to the center 10. As for the in-vehicle device 20 as well, when a driving schedule or other schedule information is stored, location information associated with a place name included in the schedule information may be set for information to be transmitted to the center 10.

The embodiment in the case where an SNS that is an example of social media is utilized is described above. The present embodiment may be applied to social media other than the SNS, from which a relationship between users is able to be acquired.

As described above, according to the present embodiment, it is possible to display, on the mobile terminal, recommendation information around a location associated with location information that the mobile terminal, such as the in-vehicle device 20 and a portable terminal, transmits to the center 10 at predetermined timing. Here, the recommendation information is information about a spot that another individual who has a relationship with a user who uses the mobile terminal on social media, such as an SNS, has actually visited. Therefore, according to the present embodiment, it is possible to provide location information (posted spot information) based on interactions between people. As a result, it is expected to provide recommendation information that further suits a preference of a vehicle user. In addition, it is possible to give an opportunity to the vehicle user to share an experience with other SNS users with whom the vehicle user has interactions.

In the present embodiment, the center 10 is an example of the information processing device. The in-vehicle device 20 is an example of a terminal. The location information that is transmitted from the in-vehicle device 20 is an example of first location information. The posted spot information and the recommendation information are an example of second location information. The vehicle user is an example of a first user. The SNS user who has a relationship with the vehicle user is an example of a second user. The location information receiving unit 11 is an example of a receiving unit. The recommendation information transmission unit 14 is an example of a transmission unit.

The embodiment of the disclosure is described in detail above; however, the disclosure is not limited to the specific embodiment. The disclosure may be modified or altered in various forms within the scope of the disclosure recited in the appended claims.

What is claimed is:

1. An in-vehicle device that is connected to an image pickup device and that is utilized by a first user, the in-vehicle device comprising:
   a location information transmission unit configured to transmit first location information indicating a location of the in-vehicle device to an information processing device;
   a visit history receiving unit configured to receive visit history information of a second user, the visit history information being acquired by the information processing device based on preference information of the first user indicating a preference of the first user; and
   an image pickup control unit configured to cause the image pickup device to acquire an image based on a result of comparison between a first location indicated by the first location information and a second location indicated by second location information about a visited place which is visited by the second user included in the visit history information.

2. The in-vehicle device according to claim 1, wherein the second user is a user having a relationship with the first user on social media.

3. The in-vehicle device according to claim 1, wherein a degree of similarity between the preference indicated by the preference information of the first user and a preference of the second user is higher than or equal to a predetermined degree.

4. The in-vehicle device according to claim 3, wherein the degree of similarity increases as a degree of relationship between the first user and the second user on social media increases.

5. The in-vehicle device according to claim 4, wherein the degree of similarity is determined based on at least one of a birthplace of each of the first user and the second user, an age of each of the first user and the second user, a common friend of both the first user and the second user, a hobby of each of the first user and the second user, a place of work of each of the first user and the second user, an exchange of a comment between the first user and the second user on the social media, the number of times that the first user reads a post of the second user, and the number of times that the second user reads a post of the first user.

6. The in-vehicle device according to claim 1, wherein the second location information is information uploaded to social media by the second user.

7. The in-vehicle device according to claim 1, wherein the second location information is information indicating a location at which an image uploaded to social media by the second user is acquired or information indicating a location associated with post information posted to social media by the second user.

8. The in-vehicle device according to claim 1, wherein:
the visited place is a facility, sightseeing area, or shop that the second user has ever visited; and
the second location is a location of the facility, a location of the sightseeing area, or a location of the shop.

9. The in-vehicle device according to claim 1, wherein the image pickup control unit is configured to cause the image pickup device to acquire the image from when a distance between the first location and the second location becomes shorter than or equal to a first predetermined distance to when the first location and the second location coincide with each other.

10. The in-vehicle device according to claim 9, wherein the image pickup control unit is configured to extract, from the images acquired by the image pickup device, the image at a time when the first location and the second location coincide with each other or the image at a time when the first location is located near the second location.

11. The in-vehicle device according to claim 9, further comprising a visit history display unit configured to, when the distance between the first location and the second location becomes shorter than or equal to a second predetermined distance longer than the first predetermined distance, display the second location and a name of the second user on map data.

12. The in-vehicle device according to claim 1, wherein the first user is a user of a vehicle on which the image pickup device is mounted.

13. An information processing device comprising:
a receiving unit configured to receive first location information from an in-vehicle device that is utilized by a first user and that is connected to an image pickup device;
a visit history acquisition unit configured to acquire visit history information of a second user based on preference information of the first user indicating a preference of the first user;
a location information acquisition unit configured to acquire second location information about a visited place included in the visit history information; and
a transmission unit configured to transmit the second location information to the in-vehicle device.

14. The information processing device according to claim 13, further comprising:
an image recording control unit configured to store an image transmitted from the in-vehicle device in a storage unit.

15. An information processing system comprising:
an in-vehicle device that is connected to an image pickup device and that is utilized by a first user; and
an information processing device communicable with the in-vehicle device via a network, wherein:
the in-vehicle device includes
a location information transmission unit configured to transmit first location information indicating a location of the in-vehicle device to the information processing device,
a visit history receiving unit configured to receive visit history information of a second user, the visit history information being acquired by the information processing device, and
an image pickup control unit configured to cause the image pickup device to acquire an image based on a result of comparison between a first location indicated by the first location information and a second location indicated by second location information about a visited place included in the visit history information; and
the information processing device includes
a receiving unit configured to receive the first location information from the in-vehicle device,
a visit history acquisition unit configured to acquire the visit history information of the second user based on preference information of the first user indicating a preference of the first user,
a location information acquisition unit configured to acquire the second location information, and
a transmission unit configured to transmit the second location information to the in-vehicle device.

16. The information processing system according to claim 15, further comprising
a social media server configured to store posts indicating spots that social media users have visited and user information of the social media users, wherein
the information processing device is configured to acquire the visit history information of the second user,
a degree of similarity between the preference of the first user and the a preference of the second user is equal to or larger than a predetermined value,
the degree of similarity is calculated based on the user information of the first user and the user information of the second user.

17. A control method for an in-vehicle device that is connected to an image pickup device and that is utilized by a first user, the control method comprising:
transmitting, by a computer included in the in-vehicle device, first location information indicating a current location of the in-vehicle device to an information processing device;
receiving, by the computer, visit history information of a second user, the visit history information being acquired by the information processing device based on preference information of the first user indicating a preference of the first user; and
causing the image pickup device, by the computer, to acquire an image based on a result of comparison between a second location indicated by second location information about a visited place included in the visit history information and a first location indicated by the first location information.

18. A non-transitory computer-readable recording medium on which a program is recorded, the program being a control program for an in-vehicle device that is connected to an image pickup device and that is utilized by a first user, the program causing a computer included in the in-vehicle device to execute instructions for:
- transmitting first location information indicating a current location of the in-vehicle device to an information processing device;
- receiving visit history information of a second user, the visit history information being acquired by the information processing device based on preference information of the first user indicating a preference of the first user; and
- causing the image pickup device to acquire an image based on a result of comparison between a second location indicated by second location information about a visited place included in the visit history information and a first location indicated by the first location information.

19. An information processing method comprising:
- receiving, by an information processing device, first location information from an in-vehicle device that is utilized by a first user and that is connected to an image pickup device;
- acquiring, by the information processing device, visit history information of a second user based on preference information of the first user indicating a preference of the first user;
- acquiring, by the information processing device, second location information about a visited place included in the visit history information; and
- transmitting, by the information processing device, the second location information to the in-vehicle device.

20. A non-transitory computer-readable recording medium on which a program is recorded, the program causing an information processing device to execute instructions for:
- receiving first location information from an in-vehicle device that is utilized by a first user and that is connected to an image pickup device;
- acquiring visit history information of a second user based on preference information of the first user indicating a preference of the first user;
- acquiring second location information about a visited place included in the visit history information; and
- transmitting the second location information to the in-vehicle device.

* * * * *